United States Patent [19]
Edgett

[11] 3,920,130
[45] Nov. 18, 1975

[54] PART LOADER

[75] Inventor: Clifford T. Edgett, Minneapolis, Minn.

[73] Assignee: Inventors Engineering, Inc., Minneapolis, Minn.

[22] Filed: July 5, 1974

[21] Appl. No.: 485,911

[52] U.S. Cl............................ 214/1 BD; 214/147 T
[51] Int. Cl.².......................................... B21G 13/10
[58] Field of Search............ 214/1 BD, 1 BV, 147 T

[56] References Cited
UNITED STATES PATENTS

| | | | |
|---|---|---|---|
| 3,127,026 | 3/1964 | Blatt | 214/1 BD |
| 3,507,403 | 4/1970 | Moore | 214/1 BD |
| 3,627,148 | 12/1971 | Hediger | 214/1 BD |

FOREIGN PATENTS OR APPLICATIONS

| | | | |
|---|---|---|---|
| 1,627,174 | 5/1967 | Germany | 214/1 BV |

Primary Examiner—Robert J. Spar
Assistant Examiner—George F. Abraham
Attorney, Agent, or Firm—Dugger, Johnson & Westman

[57] ABSTRACT

A part loader for an assembly machine which comprises a pick and place unit that is operated through a cycle of operation wherein it will pick up a part to be assembled from a supply tray or track, and will lift and move the part transversely into position over an assembly station, wherein the part will then be dropped or assembled with a second part. The movement provides for positive lateral transfer of parts from a conveyor or feed chute into alignment with the assembly station.

3 Claims, 6 Drawing Figures

PART LOADER

BACKGROUND OF THE INVENTION

1. Field of the Invention

The present invention relates to a part loader which pivots to pick up a part to be assembled, and moves it laterally into a second position wherein it is deposited for assembly with a second part.

2. Prior Art

Two part assembly machines in general are known in the art. U.S. Pat. No. 3,750,256 shows a continuous motion two part assembly machine using a continuously rotating turntable on which the assembly operations are carried out.

U.S. Pat. No. 3,764,022 shows a member that chucks a part and broadly shows a swinging and vertically movable unit, but does not show an assembly operation. Also, U.S. Pat. No. 3,610,449 shows a transfer device. U.S. Pat. Nos. 2,804,727 and 3,608,188 broadly show the idea of moving parts from one position to another as well, in different types of operations.

Further, U.S. Pat. No. 3,279,045 illustrates transferring of parts to be assembled from a conveyor into an assembly area.

However, none of these devices show a pick and place device that will pick up parts from a conveyor, and then lift and laterally shift the part to an assembly position.

SUMMARY OF THE INVENTION

The present invention relates to a part loading machine, and more particularly to a part loader or transfer mechanism that is positioned at an assembly station and is movable to pick up a part from a parts conveyor or track, and laterally shift the part into a position where it can be assembled in relationship to a second part that is independently carried to the assembly position.

In the particular form of the invention shown, a gripping chuck will engage a part, lift it and shift the part laterally to its assembly position. The second part is mounted onto a table, such as an indexing tool table which carries the second part between several stations, and wherein assembly and other operations take place at these stations.

The part loader of the present invention is easily set up, and forms a very compact unit that provides a substantial amount of movement for transferring parts from their storage conveyor to the assembly position to insure that each of the parts is individually picked up and placed into proper position for assembling without interference with the unit or table carrying the second part. The mechanism is positively mechanically operated to avoid skips or misses, and in this way insures reliable operation.

DESCRIPTION OF THE PREFERRED EMBODIMENT

Figure 1:
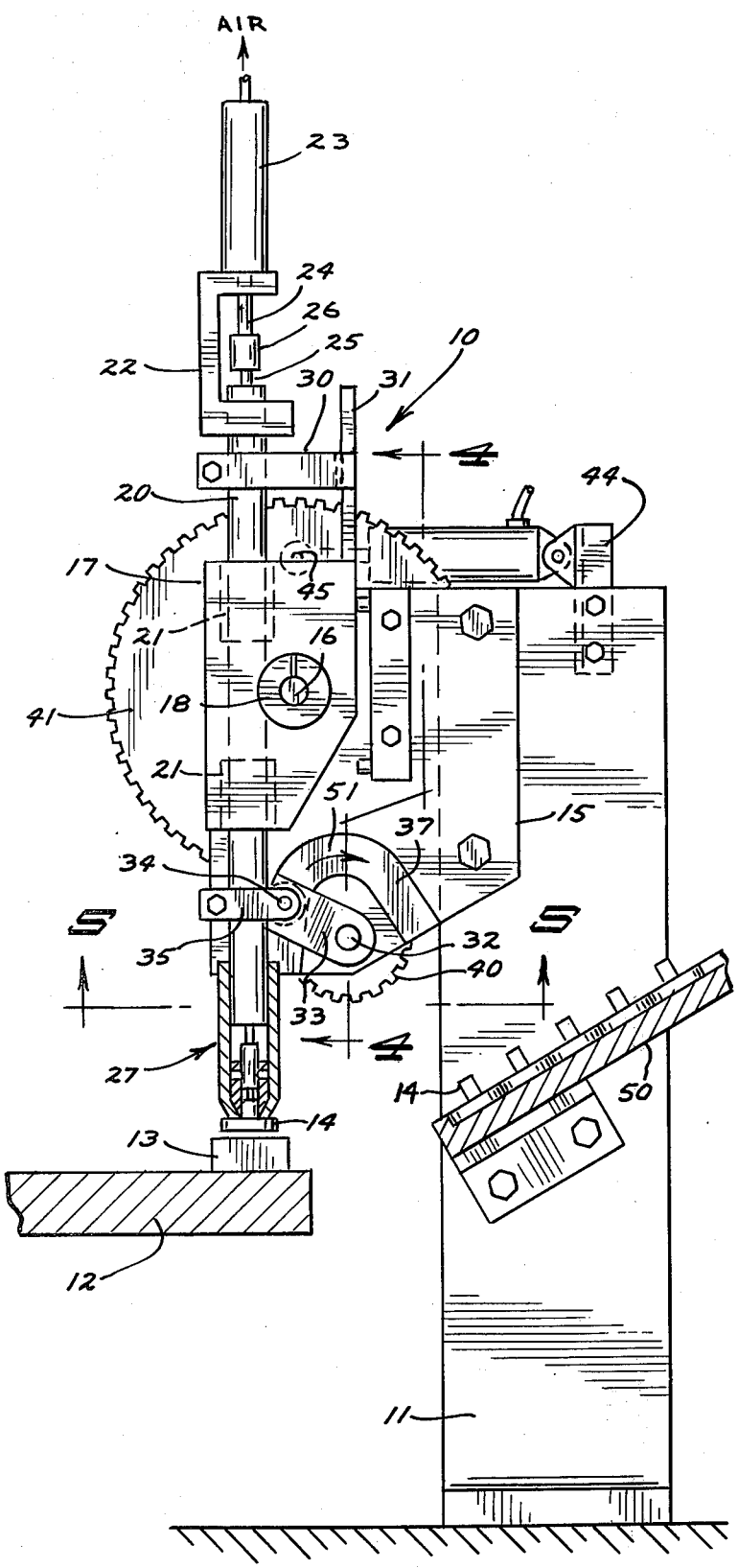
FIG. 1 is a side elevational view of a part loader made according to the present invention.
Figure 2:
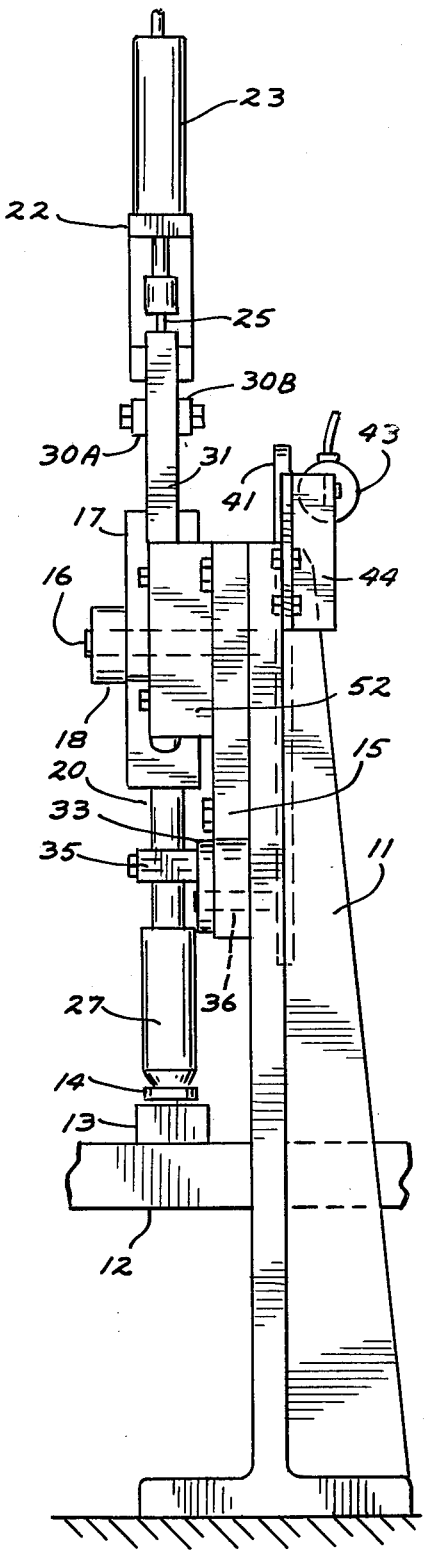
FIG. 2 is an end elevational view of the device of FIG. 1.

Referring generally to FIG. 1, a part loader illustrated generally at 10 is mounted onto a support 11 that is shown schematically, and is suitably held in place with reference to an indexing table shown only fragmentarily at 12. The table 12 is of conventional design that rotates about an upright axis displaced from the assembly machine 10, and has different loading stations thereon. A first part illustrated schematically at 13 may be placed in a desired position on the table, and the table is indexed to position shown in FIG. 1 where the first part will receive a second part 14 that is carried by the machine 10. The indexing table 12 can be of the form shown in U.S. Pat. No. 3,735,470 which illustrates an indexing tool table of a suitable form. The table 12 is used to move the part 13 into the position underlying the part transfer mechanism of the machine 10.

The support 11 may be mounted in any suitable manner so that it is independent of the table 12, and is positioned adjacent to the peripheral edge as shown. The support 11 includes a main mounting bracket 15 thereon, and the mounting bracket supports a pivot pin or shaft 16. A pivot housing 17 is mounted on one portion of pin 16 for pivotal movement about the axis of the pin 16. The pivot housing 17 is held in place on the pin with a suitable collar 18. The pivot bracket 17 thus is free to pivot about the axis of the pin 16. The pivot bracket 17 has an opening therethrough and a hollow shaft 20 is slidably mounted in this opening of pivot bracket 17 on suitable bearings shown in dotted lines at 21. The shaft 20 slides in direction along its longitudinal axis which is perpendicular to the axis of pin 16.

Shaft 20 in turn has a bracket 22 attached to the upper end thereof which mounts a spring return air cylinder 23 that controls a piston rod 24 of the cylinder that is coupled with a coupling 26 to the rod 25. The rod 25 extends through a center opening in the shaft 20, and as shown and as will be explained, the rod 25 controls operation of a chuck assembly illustrated generally at 27 at the lower end of the shaft 20. The chuck assembly 27 is used for handling parts.

A bifurcated guide fork 30 is mounted onto the upper portions of the shaft 20 above the pivot bracket 17, and the bifurcated legs of this fork illustrated at 30A and 30B, are on opposite sides of an upright guide post 31 that is fixed to the pivot bracket 17. The shaft 20 is thus slidably restrained from rotating about its axis.

The movement of the shaft 20 axially along its longitudinal axis with respect to the pivot bracket 17, and also the pivoting of the pivot bracket 17 is controlled by a crank arm linkage. As shown, a drive shaft 32 is rotatably mounted in the lower portions of the mounting bracket 15, and a crank arm 33 is drivably mounted onto the shaft 32. The crank arm 33 in turn is pivotally connected through a connecting member 34 to a connecting link 35 that is fastened to, and can be adjusted longitudinally along, the lower portions of the shaft 20, below the pivot bracket 17.

Figure 5:
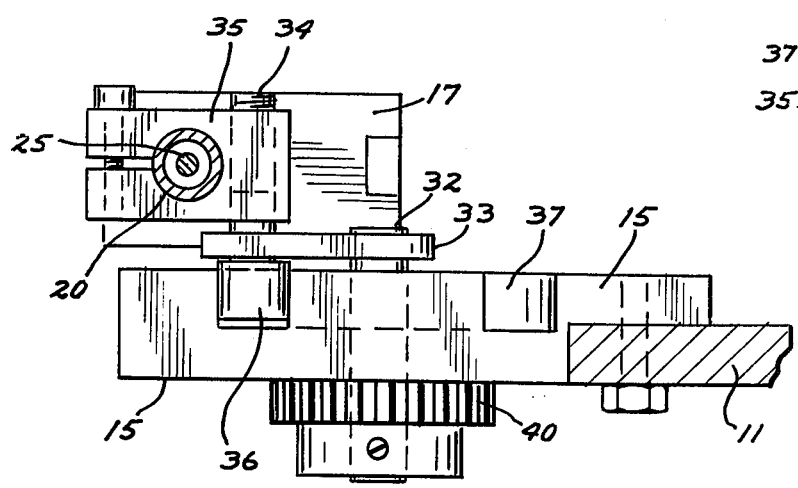
FIG. 5 is a sectional view taken as on line 5—5 in FIG. 1.

The connect member 34 between the link 35 and crank arm 33 comprises a pin that also mounts a roller 36 on the opposite side of the crank arm from the line 35 (see FIG. 5). This roller 36 is guidably mounted in a track 37 that is defined in one side surface of the mounting bracket 15, and which describes a part circular arc to accommodate movement of the roller 36 as the crank arm 33 is moved in an oscillating cycle of operation. The connecting member 34 is slidably and pivotally movable with respect to crank arm 33 to a degree which permits roller 36 to be guided in the track 37 as shown.

The shaft 32 is rotatably mounted in the bracket 15 in suitable bushings, and on the opposite side of the bracket 15 from the crank arm 33 a spur gear 40 is drivably mounted onto the shaft 32. The spur gear 40 in turn is driven by a large gear 41 that is rotatably mounted on the opposite end portion of pin 16 from bracket 17. Gear 41 is held in place on the shaft with a suitable collar 42. The gear 41 is reciprocally driven about its axis in order to operate the unit as will be explained, through the use of a fluid pressure cylinder illustrated generally at 43. The gear 41 also can be operated by a mechanical linkage such as a cam and cam arm. The cylinder 43 is attached to a bracket 44 and has an extendable and retractable rod that is attached to a suitable connection pin 45 that is fixed to the gear in a suitable manner.

When the cylinder 43 is extended or retracted in a conventional manner using a valve to supply fluid under pressure, the gear 41 will rotate, and will drive the gear 40. The shaft 32 is therefore driven through a preselected amount of arc depending on the stroke of cylinder 43. Because of the gear ratio the smaller gear 40 will rotate a greater number of degrees than the large gear.

The pin 34 is moved by the crank so that it passes through the plane defined by the axes of pins 16 and 32 and thus the shaft 20 changes direction of sliding when it is operated.

The parts 14 are supplied in a tray or trough 50 that is a gravity feed magazine or part supply track. The parts are normally introduced into the trough 50 by a bowl type vibratory conveyor or the like which is known in the art and supplies the parts sequentially so that they will slide into the trough. As the end part 14 is removed, another part will slide into position.

When the parts are to be picked up, the cylinder will be extended from position shown in FIG. 1.

The gear 40 will be rotated to drive the crank arm 33 in the direction indicated by arrow 51 in FIG. 1. The roller 36 will move in the track 37, and the pin 34 will drive through link 35 to slide the shaft 20 upwardly in bearings 21 relative to pivot bracket 17. The pivot bracket 17 also is pivoted about the axis of pin 16, thereby tilting the pivot bracket as the shaft 20 is slid upwardly (the shaft will also carry the cylinder 23 and associated bracket 22 upwardly). Bracket 30 slides along the guide 31 as well. The bracket 30 and guide 31 prevent the shaft 20 from twisting during operation. The gear 41 will be driven a sufficient distance so that the pin 34 goes over center with respect to the axes of pins 16 and 32 so that shaft 20 reverses direction when operated. The pivot bracket then reaches the position shown in FIG. 3 wherein the chuck 27 will be pulled down onto an outwardly and extending portion 14A of the end part 14 in trough 50.

Figure 6:
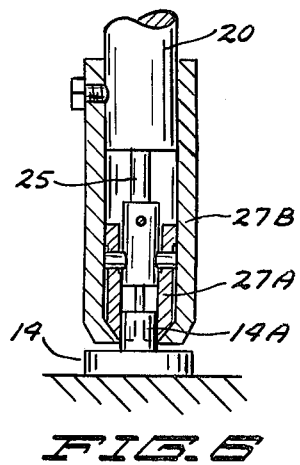
FIG. 6 is a vertical sectional view of a typical chuck used for picking one of the parts from a part supply and carrying the part to assembly position.
Figure 4:
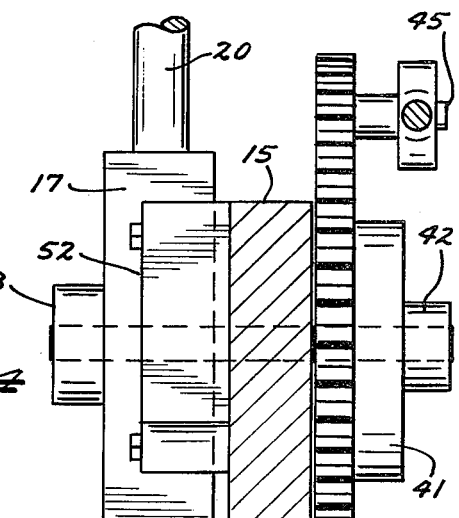
FIG. 4 is a sectional view taken as on line 4—4 in FIG. 1.

The chuck 27 is well known in the art and can be seen in detail in FIG. 6. When the chuck is over the portion 14A of the part 14, the cylinder 23 is powered by operation of a valve to pressurize the cylinder. The cylinder 23 is a spring retracted cylinder and when powered rod 25 is extended forcing the jaws 27A against a tapered surface at the end of the clutch housing 27B to grip the portion 14A of the end part 14.

Figure 3:
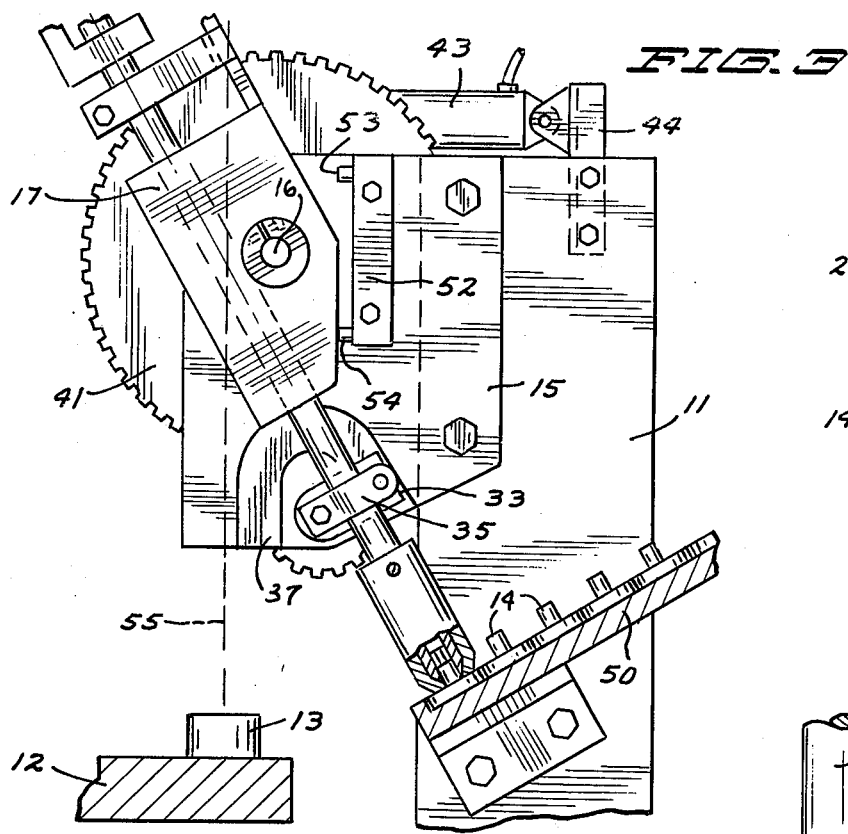
FIG. 3 is a fragmentary enlarged side view of the device of FIG. 1 showing the part loaded in position to pick up a part to be assembled.

It should be noted that the shaft 20 first moves up, at the same time that the bracket 17 starts to pivot, and then in the last portion of the stroke in the track 37 before it reaches the position shown in FIG. 3, the chuck 27 will be moving substantially straight down onto the part 14 so that the end or protruding portion of the part 14 will easily slip inside the chuck opening in a straight line motion. The small jaws 27A will be cammed closed against the part 14 and hold it securely.

The cylinder 43 is then reversed in operation, driving the crank arm 33 in opposite direction through gears 40 and 41 and causing the chuck 27 to lift the end part 14 from trough 50 and carry it upwardly out of the trough 50, and then laterally over to position wherein it will come down vertically above the part 13 that will be positioned on the indexing table 12. The table 12 can be indexed to a new position carrying a new part 13 to the assembly position while the chuck 27 is being transported over to pick up a new part 14. The chuck 27 is positioned so that the part 14 is immediately above the part 13. The cylinder 43 can be stopped at any desired position. Then the cylinder 23 is released and spring force retracts the rod 25 and jaws 27A so that the part 14 will drop out of the chuck 27 and into position. If desired the chuck 27 could be driven to force the part 14 into the part 13 before the part 14 is released. The transfer machine can also be used to place the first part onto an assembly station (before part 13 is placed) if desired for proper operation.

The longitudinal axial position of the shaft 20 with respect to the pivot bracket 17 is thus controlled by an independent crank arm or mechanical linkage, and the pivoting of the bracket 17 also is controlled by this linkage between two positions. The bracket 17, as shown is stopped from pivoting beyond its two extreme positions with a stop bracket 52 that has a stop member 53 for holding the pivot bracket 17 in its vertical or working position, and a stop member 54 that is engaged by a portion of the bracket 17 when the bracket is tilted to position wherein it will pick up the part 14 from trough 50. The stops also aid in positively locating the chuck 27 for movement substantially axially linearly onto the end portion 14A of the part to be picked up, because the pivoting of the bracket 17 is stopped in a desired position. The members 53 and 54 can be made to be adjustable if desired.

It should be noted that in FIG. 3 the dotted line indicated at 55 is the axis of operation of the unit in its working position, and the new part 13 carried by the indexing table 12 is centered on this axis while the chuck 27 is over picking up a new part 14 from the trough 50.

Thus a very simple pick and place unit for transferring parts from a parts conveyor or trough over to an assembling position is easily accomplished with simple mechanical means that give great reliability to operation.

What is claimed is:

1. A transfer machine for moving parts from a part supply to an assembly position laterally offset from the part supply comprising a support, means to mount said support adjacent to a supply of parts, a pivot bracket, means to pivotally mount said pivot bracket on said support for movement about a first axis oriented so that said pivot bracket moves in a lateral direction relative to a part supply when it pivots, a part pick up member including a shaft slidably mounted on said pivot bracket for movement along its longitudinal axis, and chuck means on said shaft for picking up a part from a part supply and releasing a held part, means defining a guide track on said support adjacent to said shaft, and drive means for said shaft and chuck means including bracket means attached to said shaft, a connecting member connected to said bracket means, a track follower mounted in said drive track and connected to said connecting member, and a mechanical crank arm linkage driving said connecting member, and thereby said bracket means and track follower, said drive means being adapted to drive said shaft along its longitudinal axis and at the same time control movement of said pivot bracket about its pivot axis, said crank arm and track means being positioned so that as said crank arm moves in an oscillating stroke, said chuck means and shaft are first moved in axial direction of said shaft relative to said pivot bracket at either end of said oscillating stroke, and in the midportions of said oscillating stroke said chuck means is moved laterally about said first axis.

2. The combination as specified in claim 1 and power means to operate said chuck means to releasably retain a part in said chuck.

3. The combination as specified in claim 2 wherein said drive means comprises a set of gears, one of which is connected to said crank arm, and a reciprocating hydraulic cylinder driving one of said gears to rotate said crank arm through a preselected number of degrees.

* * * * *